Figure 1:
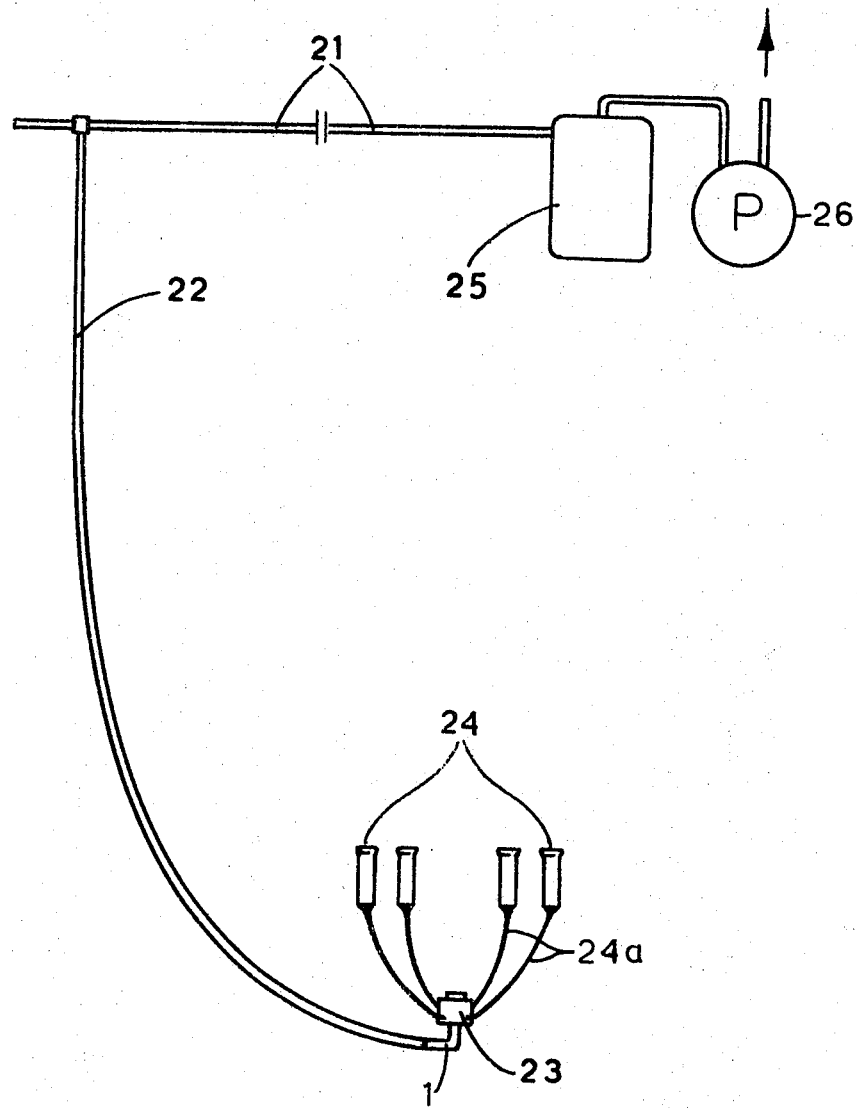

United States Patent

[11] 3,528,389

[72] Inventor Sigismund Flöter,
       Horst in Holstein, Germany
[21] Appl. No. 642,457
[22] Filed May 31, 1967
[45] Patented Sept. 15, 1970
[73] Assignee Alfa-Laval AB
       Tumba, Sweden
       a corporation of Sweden
[32] Priority June 10, 1966
[33] Germany
[31] A 52,715

[54] VACUUM MILKING SYSTEM
3 Claims, 3 Drawing Figs.
[52] U.S. Cl. ................................................... 119/14.55,
                                                        119/14.43
[51] Int. Cl. ............................................. A01z 5/00
[50] Field of Search ..................................... 119/14.55,
       14.54, 14.08, 14.32, 14.43, 14.44, 14.01, 14.02,
                                                        14.1, 14.36

[56] References Cited
UNITED STATES PATENTS

| 766,845 | 8/1904 | Sharples | 119/14.02 |
| 2,667,856 | 2/1954 | Heckendorf | 119/14.43X |
| 3,150,637 | 9/1964 | Fosnes | 119/14.54 |

FOREIGN PATENTS

| 12,966 | 2/1910 | Denmark | 119/14.54 |

Primary Examiner—Hugh R. Chamblee
Attorney—Davis, Hoxie, Faithfull and Hapgood

ABSTRACT: The milk from a cluster of teat cups is conveyed by way of an ascending pipe to a milk pipe-line maintained under vacuum to suck the milk into the pipe-line. The teat cups are connected to the ascending pipe through a vacuum reduction valve having a milk outlet and control means which automatically diminish the throughflow area of the outlet in response to an increase in the vacuum at the outlet. The control means preferably include a valve element movable by a diaphragm wall of the valve housing to vary said throughflow area, the diaphragm being subjected to the vacuum at the outlet and being biased by means adjustable to determine the maximum vacuum in the housing and interconnected teat cups.

Patented Sept. 15, 1970

3,528,389

Sheet 2 of 2

INVENTOR.
Sigismund Flöter

BY

Davis, Hoxie, Faithfull & Hapgood

VACUUM MILKING SYSTEM

The present invention relates to an improved milking system of the vacuum type.

In modern vacuum milking systems, a milk pipe-line extends along the cattle stalls at a height of about 2 meters, and through this pipe-line the milk from the cows is conveyed by a vacuum pump and flowing air to a milk collecting container. The individual teat cup clusters are each connected through an ascending pipe to the suction pipe-line at a corresponding connection point. Owing to the difference in height between the teat cup cluster (situated at the level of the cow udder) and the milk pipe-line, there is an appreciable vacuum difference between them as soon as the ascending pipe is filled with liquid. At a desired vacuum teats, about $-0.5$ kp/cm$^2$ in the individual teat cups at the teats, a vacuum of about $-0.65$ kp/cm$^2$ is necessary in the milk or suction pipe-line, when the liquid column has a height of 1.5 meters in the ascending pipe. In such an arrangement, however, difficulties occur at the end of the milking operation when milk is no longer given off (blind milking), since the higher vacuum of $-0.65$ kp/cm$^2$ acts directly upon the udder teats as soon as the ascending pipe is no longer filled with milk. As a result, the blood circulation in the teats and the function of the sphincters are adversely influenced, which impairs the udder health and reduces the milk production.

In order to avoid these drawbacks, an air inlet has been provided between the teat cup cluster and the ascending pipe leading to the suction pipe-line. In this way, the milk column in the ascending pipe is always interrupted by large air bubbles, so that the effective height of the liquid column is appreciably smaller than the height difference between the teat cup cluster and the suction pipe-line. Thus, it is possible to reduce correspondingly the difference between the desired vacuum in the teat cups and the necessary vacuum in the suction pipe-line.

Vacuum milking systems are also known in which an increase of the vacuum at the teats in blind milking is prevented by an interconnected vacuum control valve which, when the vacuum is increased above an adjusted predetermined value, supplies atmospheric air until the pressure in the teat cup cluster again has been increased to the predetermined value.

The necessary air supply from the cow-house room in prior vacuum milking systems is very unsuitable for hygienic reasons. In addition, there is the risk of the milk structure being changed, since the milk sucked in leads to a strong turbulence and, due to the thorough and intensive mixing under certain circumstances, also to chemical changes. From a technical point of view, the supply of air in order to avoid too high a vacuum in a blind-milking teat cup cluster is especially unsuitable, since the vacuum in the suction pipe-line is thereby reduced and thus will no longer suffice for the operation of other teat cup clusters connected to the same suction pipe-line.

The present invention therefore has for its principal object the provision of a vacuum milking system in which, despite the necessary vacuum difference between the teat cup cluster and the milk pipe-line, an adjustable vacuum is automatically maintained constant at the teats without it being necessary to supply air to the system, so that the drawbacks inherent in such air supply are avoided.

According to the invention, the teat cup cluster is connected through a vacuum reduction valve to the ascending pipe leading to the milk pipe-line, and the milking system is characterized in that the vacuum reduction valve includes means automatically diminishing the throughflow area of its outlet in response to an increase in the vacuum. Preferably, the vacuum reduction valve comprises a housing having one wall formed by a diaphragm fixed to a valve spindle which extends into the interior of the housing and cooperates with a valve seat at the valve outlet, nipples being provided for connecting said outlet to the ascending pipe and for connecting the housing interior to the teat cup cluster. The valve also includes biasing means, preferably adjustable, acting upon the valve spindle to lift the latter from the valve seat in opposition to the action of the vacuum upon the diaphragm.

The vacuum reduction valve is inserted, for example, in the junction body of the teat cup cluster or close to the cluster in the hose forming the ascending pipe. This valve is adjusted to a predetermined maximum vacuum which must not be exceeded in the teat cup cluster. The vacuum can be higher in the suction pipe-line to an arbitrary degree, since the vacuum reduction valve closes the connection between the teat cup cluster and the ascending pipe (leading to the suction pipe-line) as soon as the vacuum in the teat cup cluster or the valve housing increases above the predetermined value. An air supply is not necessary in order to reduce the vacuum in the teat cup cluster or to interrupt the liquid column in the ascending pipe. If desired, of course, a small hole may be provided, for example in the housing of the vacuum reduction valve, through which a small amount of air can flow so as to interrupt the liquid column in the ascending pipe. Preferably, however, the vacuum in the suction pipe-line is of such a degree that the suction action is sufficient when the liquid column in the ascending pipe is uninterrupted.

Figure 2:
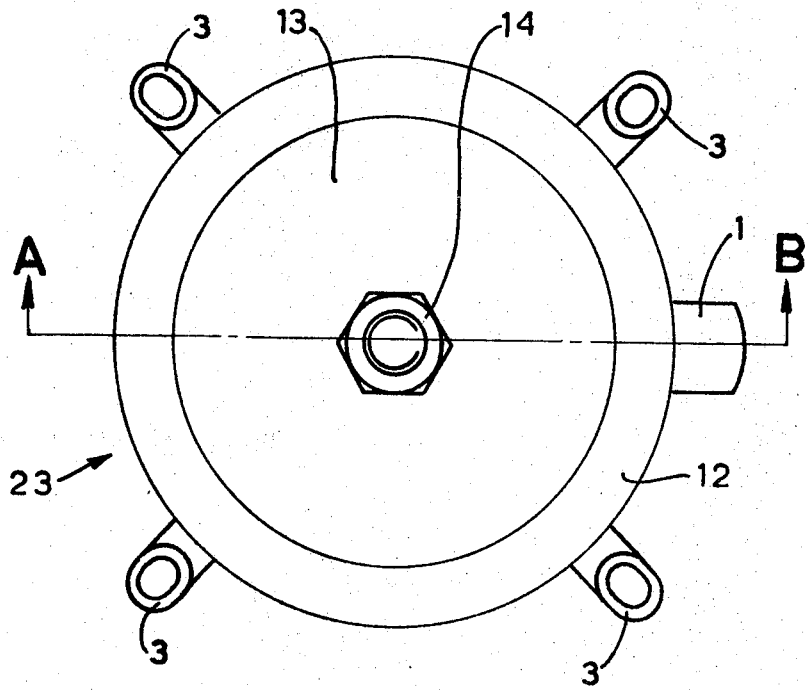

The invention is described below in more detail with reference to the accompanying drawings in which FIG. 1 is a schematic view of a vacuum milking system embodying the invention; FIG. 2 is a plan view of one embodiment of the vacuum reduction valve shown in FIG. 1; and FIG. 3 is a sectional view along the line A—B in FIG. 2.

The milking system comprises a suction pipe-line 21 which leads from the individual milking places to a milk collecting container 25, the latter being connected to a vacuum pump 26. At each milking place is a cluster of teat cups 24 having their milk tubes 24a connected to the suction pipe-line 21 through an ascending pipe 22, for example, a hose connection. According to the invention, there is provided between the ascending pipe 22 and the teat cups 24 a vacuum reduction valve 23, of which a preferred embodiment is shown in FIGS. 2 and 3. The new valve serves, quite generally, to reduce a higher vacuum on the outlet side of the valve to a predetermined adjustable maximum value.

Figure 3:
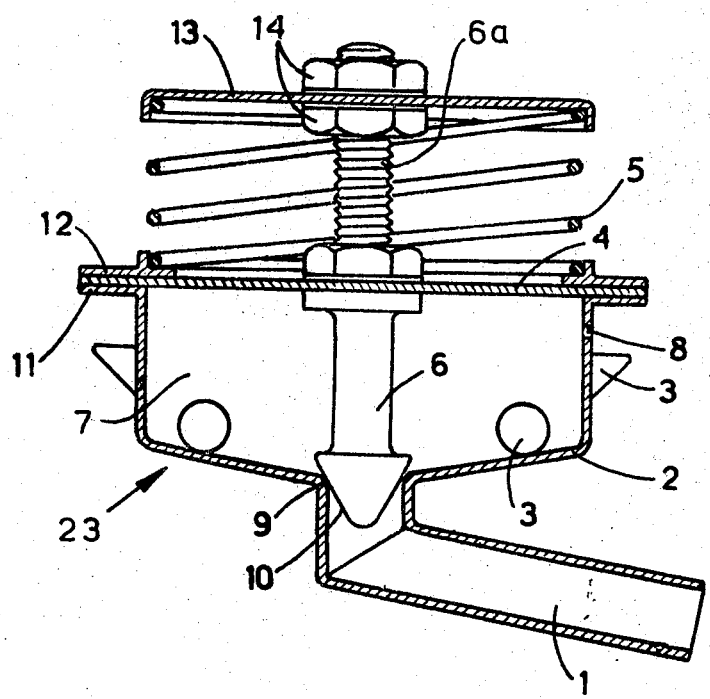

As shown in FIGS. 2 and 3, the valve 23 comprises a cylindrical housing 2 provided at the underside with a nipple 1. The nipple 1 is connected to the ascending pipe 22 and consequently to the suction pipe-line 21 (FIG. 1) in which a higher vacuum prevails. Four nipples 3, which are connected to the milk tubes 24a of the individual teat cups, are provided at the sides of housing 2. At its open upper side, the housing 2 has an annular flange 11 bent out at right angles and carrying a resilient diaphragm 4 which is fixed to the flange 11 in a suitable manner, as by means of an annular clamping member 12. A valve spindle 6 is fixed to the diaphragm 4 and has a depending head or valve element 10 which, in the closed position of the valve, is pressed against a valve seat 9 forming an outlet from which the nipple 1 leads.

The diaphragm 4 is pulled more or less downward by a vacuum prevailing in the valve chamber 7, depending upon the height of the vacuum and the resiliency of the diaphragm. Thus, the cross-section or throughflow area of the outlet 9 is diminished more and more as the vacuum increases in chamber 7 and nipple 1, until the valve closes completely when a predetermined maximum vacuum is reached. The diaphragm 4 is acted upon by adjustable biasing means which, in the illustrated embodiment, comprise a spring 5 compressed between the annular member 12 secured to the housing and a flanged retaining disc 13 adjustably secured to the diaphragm. The latter securement includes a threaded extension 6a of the valve spindle, and nuts 14 screwed on this extension and between which the disc 13 is clamped. Spring 5 urges the diaphragm 4 upwardly against the action of the vacuum in chamber 7; and by varying the compression of the spring through upward or downward adjustment of the nuts 14, the valve can be adjusted so that it closes completely at a predetermined vacuum. As soon as the vacuum in the teat cup cluster 24 and consequently in the chamber 7 of the valve is reduced, as by small amounts of air entering between the teats and the teat cup liners, the connection to the suction pipe-line 21 is automatically kept open by the valve spindle 6 being lifted until the predetermined maximum vacuum is reached.

It will be understood that the teat cups 24 include, in addition to the milk tubes 24a, the usual tubes (not shown) through which the teat cup liners are pulsated pneumatically to effect the milking action.

I claim:

1. A vacuum milking system comprising in combination with a cluster of teat cups, a milk pipe-line maintained under vacuum, and a pipe ascending from said cluster for conveying milk from the teat cups to said pipe-line, a vacuum reduction valve through which said cluster is connected to the ascending pipe and including an outlet and control means for automatically diminishing the throughflow area of said outlet in response to an increase in the vacuum at said outlet, said control means including a movable wall biased in one direction and movable in the opposite direction in response to said vacuum increase to diminish said throughflow area.

2. The combination according to claim 1, in which said valve comprises a housing having a valve seat forming said outlet and having inlet nipples through which the teat cups are connected to the interior of the housing, the housing also having an outlet nipple through which said outlet is connected to the ascending pipe, said control means including a diaphragm forming said movable wall, and a valve spindle secured to the diaphragm and extending into the interior of the housing, said valve spindle having a part movable by the diaphragm to vary said throughflow area.

3. The combination according to claim 1, in which said control means also include means for adjusting said bias of the movable wall in said one direction.